United States Patent
Stabler et al.

(10) Patent No.: US 10,532,340 B2
(45) Date of Patent: *Jan. 14, 2020

(54) HIGH PERFORMANCE SORPTION BINDER FOR GAS PHASE STORAGE DEVICES

(71) Applicant: Arkema Inc., King of Prussia, PA (US)

(72) Inventors: Sean M. Stabler, Pottstown, PA (US); Azaz A. Vahora, Eagleville, PA (US); Denis Kato De Almeida, Philadelphia, PA (US); Florence Mehlmann, Berwyn, PA (US); Ramin Amin-Sanayei, Malvern, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,682

(22) Filed: Jul. 11, 2018

(65) Prior Publication Data

US 2018/0318789 A1    Nov. 8, 2018

Related U.S. Application Data

(63) Continuation-in-part of application No. 15/768,682, filed as application No. PCT/US2016/047445 on Aug. 18, 2016.

(60) Provisional application No. 62/207,401, filed on Aug. 20, 2015.

(51) Int. Cl.

| B01J 20/20 | (2006.01) |
|---|---|
| B01J 20/26 | (2006.01) |
| B01J 20/28 | (2006.01) |
| B01J 20/30 | (2006.01) |
| B01D 53/02 | (2006.01) |

(52) U.S. Cl.
CPC ............ B01J 20/20 (2013.01); B01J 20/261 (2013.01); B01J 20/2803 (2013.01); B01J 20/28007 (2013.01); B01J 20/2808 (2013.01); B01J 20/28064 (2013.01); B01J 20/28066 (2013.01); B01J 20/28073 (2013.01); B01J 20/28083 (2013.01); B01J 20/3007 (2013.01); B01J 20/3042 (2013.01); B01D 53/02 (2013.01); B01D 2253/102 (2013.01); B01D 2253/106 (2013.01); B01D 2253/108 (2013.01); B01D 2253/204 (2013.01); B01D 2253/25 (2013.01); B01D 2253/306 (2013.01); B01D 2253/308 (2013.01)

(58) Field of Classification Search
CPC ....................................................... B01J 20/20
See application file for complete search history.

(56) References Cited

U.S. PATENT DOCUMENTS

| 4,999,330 | A |  | 3/1991 | Bose et al. |
|---|---|---|---|---|
| 5,019,311 | A |  | 5/1991 | Koslow |
| 5,147,722 | A |  | 9/1992 | Koslow |
| 5,331,037 | A |  | 7/1994 | Koslow |
| 5,948,398 | A | * | 9/1999 | Hanamoto ............... A61L 9/01 424/76.1 |
| 5,956,225 | A |  | 9/1999 | Okuyama et al. |
| 6,395,190 | B1 |  | 5/2002 | Koslow et al. |
| 9,839,881 | B2 |  | 12/2017 | Stabler et al. |
| 2005/0260396 | A1 |  | 11/2005 | Taylor et al. |
| 2006/0030483 | A1 |  | 2/2006 | Jang |
| 2016/0021249 | A1 |  | 1/2016 | Govande et al. |
| 2016/0121249 | A1 |  | 5/2016 | Koslow |
| 2017/0007982 | A1 |  | 1/2017 | Holbrook et al. |

OTHER PUBLICATIONS

Articarbone Pure Water. clean Air. Better World. Calgon Carbon Brochure, Calgon Carbon Corporation, 2017, pp. 1-6.

* cited by examiner

*Primary Examiner* — Stuart L Hendrickson
(74) *Attorney, Agent, or Firm* — Joanne Rossi

(57) ABSTRACT

The invention relates to the use of a high performance thermoplastic polymer binder material for immobilizing adsorptive materials, such as activated carbon, in gas storage devices. The use of these binders, especially polyamide binders, polytetrafluoroethylene binders, or polyvinylidene fluoride binders such as Kyblock® resin, provides for high sorbent packing density, low fouling solid structure that maximizes the volume of gas to the volume of the storage space.

22 Claims, No Drawings

HIGH PERFORMANCE SORPTION BINDER FOR GAS PHASE STORAGE DEVICES

This application is a continuation-in-part of copending U.S. application Ser. No. 15/768,682, filed Apr. 16, 2018, from which priority is claimed. This application also claims benefit, under U.S.C. § 119(e) of U.S. Provisional Application No. 62/207,401, filed Aug. 20, 2015 and PCT/US16/47445 filed Aug. 18, 2016. The cited references are incorporated herein by reference.

FIELD OF THE INVENTION

The invention relates to the use of high performance thermoplastic polymer binder materials for immobilizing adsorptive materials for gas storage devices. The use of these new binders, especially fluoropolymers or polyamide binders, provides a porous solid having a high sorbent packing density, low binder fouling of sorbent, and maximizes the volume of gas to the volume of the storage space.

BACKGROUND OF THE INVENTION

Adsorbed gas storage provides an advancement in the temporary storage of gaseous materials that overcome obstacles related to high pressure systems commercially used today to compress gases.

Gases such as noble gases, $O_2$, $N_2$, hydrocarbons, and other small gas molecules are used in many markets including, but not limited to, industrial, automotive, pharmaceutical, food, beverage, electronics, etc. Specific applications include concentrated medical oxygen, industrial desiccants, portable and residential liquefied petroleum gas (LPG), stranded gas flares, kerosene burners, cook stoves, compressed natural gas (CNG), and many others.

The storage and transport of said gases are typically in vessels where high pressures are used to condense or even liquefy the gas to utilize the greatest concentration safely possible with in an occupied volume. The pressurization process results in unwanted and excessive costs due to the energy and infrastructure requirements. In addition, there is a limitation in storage containment geometry to safely store and transport the gas; resulting in limitations of storage designs. The use of sorbents to store gases at lower pressures is known to solve some of these issues.

The technology to convert low bulk density sorbent powder into an immobilized higher density block using a thermoplastic binder is well known for filtration applications. It is also widely believed that high surface area sorption materials formed into high density compacted structures can achieve the economic storage volume needed for gases.

U.S. Pat. No. 7,708,815 describes the unique needs and challenges for the storage of hydrogen, achieved by a hydriding/dehydriding process in the presence of non-porous metal compounds, which are in the form of a fine powder of less than 30 microns. A thermoplastic binder is used to minimize packing of the metal compounds during hydriding/dehydriding cycles. The patent fails to address the needs and challenges to bind other active particles, such as carbons and molecular sieve sorbent, which have significant porosity (>40%), and larger particle sizes (>100 microns), especially those with a BET surface area greater than 1,400 $m^2/g$. Porosity is defined as the ratio of void space in a volume to the total volume. Surprisingly in these cases, we found that the role of the binder is not to minimize packing of active particles, but actually to maximize such packing. The patent also fails to teach an appropriate range for the binder particle sizes to allow for maximizing packing and good mechanical integrity of the composite hydrogen storage material, as the binder particle size of <0.1 microns is too small to effectively bind activated carbon and molecular sieve particles.

U.S. Pat. No. 4,999,330 describes the needs and challenges for the high-density sorbent used in ANG systems. High surface area activated carbon is the sorbent typically used in high density sorbent structures. However loose carbon particles have the drawbacks of low packing density, and the ability to move sorbent with the gas stream and cause potential contamination.

The U.S. Pat. No. 4,999,330 reference solves the above limitations by forming a methyl cellulose or polyvinyl alcohol binder solvent solution, coating high surface area carbon particles with the binder solution, followed by removing the solvent and compressing the binder-coated particles to cause a bulk volume reduction of 50 to 200%. The '330 system suffers from its complexity and many steps. It also involves coating the entire activated carbon particles with polymer solution—which ultimately blocks many of the micropores—this fouling reducing the amount of surface area available for adsorption. Some of the pores can be pre-filled with solvent which can later be removed by heat to unblock many of the pores, however the net effect of a full coating is a large reduction in active surface area.

US2017/0007982 uses a water soluble cellulosic binder to coat active carbon particles and form a monolith. The monolith also suffers from a complicated manufacturing process, and significant fouling of the activated carbon pores due to the binder coating. In addition, the monolith requires the incorporation of a scaffold material, to achieve good mechanical integrity. Scaffold materials include natural or synthetic fibers, such as polyester and polypropylene fibers.

Carbon block targeted for filtration applications are described in U.S. Pat. Nos. 5,019,311, 5,147,722, and 5,331,037, uses an extrusion process to produce a porous article containing bound active particles, such as activated carbon, bound together by a thermoplastic binder. The carbon block filter is designed to remove contaminants from a fluid stream—such as in the purification of water. The polymer binder, which is generally a polyethylene, is needed at a high level.

U.S. Pat. No. 6,395,190 describes carbon filters and a method for making them having a 15 to 25 weight percent of a thermoplastic binder. The problem with polyethylene and other typical binders is that high loading percentages are required to adequately hold the sorbent materials together. Poor fouling resistance is also a problem Poly(vinylidene fluoride) as a binder for carbon block filters, has been found to improve the carbon block article performance by providing effective binding at lower loading—which in turn provides greater efficiency by reducing the pressure drop when the fluid passes through the block.

Examples of such carbon block filters, as well as methods for producing them, are described for example in WO 2014/055473 and WO 2014/182861, the entire disclosures of each of which are incorporated herein by reference for all purposes. These articles use polyvinylidene fluoride or polyamide binders, rather than the polyethylene binders previously used for carbon block filtration articles. There is no mention of the use of such systems for small molecules storage, or with sorbent of high BET specific surface area greater than 1,000 $m^2/g$.

In the area of gas storage, there is a need to improve the volume of gas that can be stored in a given volume of container space (v/v$_o$), to improve the economics of this technology. The activated carbons used in filtration systems have high ball hardness and moderate BET surface area, in order to minimize the pressure drop when a fluid passes through the system. In contrast, activated carbons with low ball hardness and high BET surface areas are needed to effectively store gases, and pose different challenges when it comes to combine them with a binder. In this case, the binder needs to maximize packing of the carbon particles, instead of minimizing it in the case of filtration systems.

Surprisingly it has now been found that a high v/v$_o$ can be obtained in a gas storage article using low levels of polyvinylidene fluoride, polytetrafluoroethylene, or polyamide binders of moderate particle sizes, with suitable activated carbon. The low levels of binder have little negative effect on the ratio of activated sorbent volume to container volume. Moderate binder particle size is needed for efficient packing of the activated carbon particles, if the binder particles are too large (>1 micron), they allow for some carbon particles to remain loose, if the binder particles are too small (<0.1 micron) they can't reach multiple carbon particles which lead to ineffective binding. In addition to providing a solid adsorption article having a high density packing, low level of binder volume, the solid porous sorbent structure of the invention also show excellent resistance to fouling of the sorbent. In some cases, fouling is further reduced by processing the article of the invention at temperature equal or below the melting point of the binder. Lastly, polyvinylidene fluoride, polytetrafluoroethylene or polyamide binders also provide excellent chemical resistance to the gas storage environment. Additionally, the high relative thermal index of these polymers is useful for the temperature range an adsorptive storage monolith would encounter during the product life cycle.

SUMMARY OF THE INVENTION

The invention relates to a gas storage article comprising a solid, dense, porous sorbent media bound together by 0.5 to 30 weight percent of thermoplastic binder particles, wherein said binder particles have a discrete particle size of between 5 and 1000 nanometers, aspect ratio of 1 to 1000, and/or agglomerates between 1 and 150 micrometers The invention also relates to a sealed container containing the gas storage block article, having at least one valve opening for charging and discharging of a gas, the container capable of holding a pressurized gas.

The invention also relates to a gas storage container, holding the solid sorbent and containing natural gas (methane).

The invention also relates to a method for making a gas storage article.

DETAILED DESCRIPTION OF THE INVENTION

All references listed in this application are incorporated herein by reference. All percentages in a composition are weight percent, unless otherwise indicated, and all molecular weights are given as weight average molecular weight, unless stated otherwise. Combinations of different elements described herein are also considered as part of the invention.

"Interconnectivity", as used herein means that the active particles or fibers are permanently bonded together by the polymer binder particles without completely coating the active primary and secondary particles or functional particles or fibers. The binder adheres the sorbent at specific discrete points to produce an organized, porous structure. The porous structure allows a gas to pass through the interconnected particles or fibers, and the gas is exposed directly to the surface(s) of the sorbent particles or fibers, favoring the adsorption of the gas onto the sorbent material. Since the polymer binder adheres to the sorbent particles in only discrete points, less binder is used for complete interconnectivity compared to a binder that is coated onto the sorbent.

The invention relates to a solid porous gas storage article made of activated carbon or other gas sorbent, the sorbent material being bound together by small discrete thermoplastic polymer binder particles to provide interconnectivity. The solid porous article is generally present within a closed container, capable of holding a pressurized gas. The sorbent and binder are combined under pressure to produce a dense porous solid gas-sorbent structure.

Binder

The polymer particles of the composite of the invention are thermoplastic, elastomeric, thermoplastic volcanized (TPV), or thermoplastic elastomer (TPE) polymer particles with discrete particle sizes in the sub-micrometer range. The average discrete particle size is less than 1 micrometer, preferably less than 500 nm, preferably less than 400 nm, and more preferably less than 300 nm, with an aspect ratio of 1 to 1000. The average discrete particle size is generally at least 20 nm and preferably is higher for lower aspect ratio, i.e. at least 50 nm, most preferably at least 100 nm for aspect ratio of about 1.

Useful polymers include, but are not limited to fluoropolymers, styrene-butadiene rubbers (SBR), ethylene vinyl acetate (EVAc), ethylene vinyl alcohol (EVA), acrylic polymers such as polymethyl methacrylate polymer and copolymers, polyurethanes, styrenic polymers, polyamides, polyolefins, including polyethylene, and polypropylene and the copolymers thereof, polyester including polyethylene terephthalate, polyvinyl chlorides, polycarbonate and thermoplastic polyurethane (TPU). In order to obtain the small polymer particle size useful in the invention, it is preferred that the thermoplastic polymers are made by emulsion (or inverse emulsion) polymerization.

Preferred polymers are polyamides, and fluoropolymers such as PVDF, PTFE, PETFE, FEP, PFA, FKM, FFKM, with homopolymers and copolymers of polyvinylidene fluoride and of polytetrafluoroethylene being especially useful.

Preferably, the binder is a fluoropolymer. Useful fluoropolymers are thermoplastic homopolymers and copolymers having greater than 50 weight percent of fluoromonomer units by weight, preferably more than 65 weight percent, more preferably greater than 75 weight percent and most preferably greater than 90 weight percent of one or more fluoromonomers. Useful fluoromonomers for forming the fluoropolymer include but are not limited to: vinylidene fluoride (VDF or VF$_2$), tetrafluoroethylene (TFE), trifluoroethylene (TrFE), chlorotrifluoroethylene (CITE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or perfluorinated cyclic alkenes of $C_3$ and higher, and combinations thereof.

Especially preferred fluoropolymers are polyvinylidene fluoride (PVDF) homopolymers, and copolymers, polytetrafluoroethylene (PTFE) homopolymers and copolymers, and ploy(vinylidenefluride-hexafluoropropylene-tetrafluoroethylene) terpolymers. While the invention applies to all thermoplastic polymers, and in particular all fluoropolymers and copolymers, and polyamides, vinylidene fluoride and tetrafluoroethylene polymers will be used to illustrate the invention, and are the preferred polymer. One of ordinary skill in the art will understand and be able to apply the specific references to PVDF, P(VDF-HFP), and PTFE to these other thermoplastic polymers, which are considered to be within the realm of, and embodied in the invention.

In one embodiment, vinylidene fluoride or tetrafluoroethylene fluoride copolymers are preferred, due to their lower crystallinity (or no crystallinity), making them more flexible than the more crystalline homopolymers. Flexibility of the binder allows it to better withstand the manufacturing process, as well as increased pull-through strength and better adhesion properties.

Preferred VDF copolymers include those containing at least 50 mole percent, preferably at least 75 mole %, more preferably at least 80 mole %, and even more preferably at least 85 mole % of vinylidene fluoride copolymerized with one or more comonomers selected from the group consisting of tetrafluoroethylene, trifluoroethylene, chlorotrifluoroethylene, hexafluoropropene, vinyl fluoride, pentafluoropropene, tetrafluoropropene, trifluoropropene, perfluoromethyl vinyl ether, perfluoropropyl vinyl ether and any other monomer that would readily copolymerize with vinylidene fluoride.

In one embodiment, up to 30%, preferably up to 25%, and more preferably up to 15% by weight of hexafluoropropene (HFP) units and 70% or greater, preferably 75% or greater, more preferably 85% or greater by weight or more of VDF units are present in the vinylidene fluoride polymer. It is desired that the HFP units be distributed as homogeneously as possible to provide PVDF-HFP copolymer with excellent dimensional stability in the end-use environment.

The PVDF used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the PVDF emulsion of the invention is fluorosurfactant-free, with no fluorosurfactants being used in any part of the polymerization. Non-fluorinated surfactants useful in the PVDF polymerization could be both ionic and non-ionic in nature including, but are not limited to, 3-allyloxy-2-hydroxy-1-propane sulfonic acid salt, polyvinylphosphonic acid, polyacrylic acids, polyvinyl sulfonic acid, and salts thereof, polyethylene glycol and/or polypropylene glycol and the block copolymers thereof, alkyl phosphonates and siloxane-based surfactants.

The PVDF polymerization results in a latex generally having a solids level of 10 to 60 percent by weight, preferably 10 to 50 percent.

The PTFE homopolymers or copolymers used in the invention are generally prepared by means known in the art, using aqueous free-radical emulsion or suspension polymerization, although other polymerization processes may also be used. The molecular weight of the polymer is not especially limited, however a high weight average molecular weight may be beneficial due to the ability of the polymer to undergo fibrillation when used as a binder.

The surfactant used in the emulsion polymerization can be any surfactant known in the art to be useful in PTFE emulsion polymerization, including perfluorinated, partially fluorinated, and non-fluorinated surfactants.

The latex binder is generally reduced to a powder form by spray drying, coagulation, or other known process, to produce a dry powder. The powder shape and particle size may be modified by any know process, such as milling. The polymer may be exposed to thermal or radiation treatments to control the molecular weight of the powder.

Binder particles are generally from 5 to 700 nm in size, preferably from 50 to 500 nm, and more preferably from 100-300 nm as an average particle size. In some cases, polymer particles may agglomerate into 1 to 150 micrometer groupings, 3-50 micrometers, 5-15 micrometers, and preferably 6-8 micrometer agglomerates, but it has been found that these agglomerates can break into individual particles or fibrils during processing to for an article. Some of the binder particles are discrete particles, and remain as discrete particles in the formed solid porous sorbent article. During processing into articles, the particles adjoin sorbent material together and provide interconnectivity.

It is important that as little binder is used as necessary to hold the sorbent materials together, as this allows more of the surface area to be exposed and be active in gas absorption. One advantage of PVDF and PTFE binders is that they have a very high specific gravity of at least about 1.75 g/cc, preferably at least about 1.77 g/cc. Thus the low weight percent of binder needed represents an even lower volume percent.

The particle size of the binder plays a role in the lower weight % loadings needed to make a solid immobilized porous media block. Further the rheology of PVDF resin based on the higher molecular weights of preferably 200,000 to 5,000,000 g/mole, and preferably 300.000-900,000 g/mole, assists in the binder not flowing into the carbon and fouling the high surface area of the activated carbon sorption media.

Sorbent

The sorbents of the invention are those capable of adsorbing and desorbing specific gas molecules. In one important embodiment of the invention, activated carbon is used to adsorb natural gas (methane), however, other sorbents with adsorption specificity for other gases are also contemplated by this invention. Activated carbon, carbon fibers and molecular sieves are especially useful sorbents of the invention. Activated carbon having a large level of surface area and pore volume is especially preferred, as are nano carbon fibers. Activated carbon having a high pore volume is also preferred. Activated carbon having pore sizes suitable for the adsorption of gases are especially preferred, containing micropores (less than 20 Å) and/or mesopores (20 to 500 Å). Literature supports that gas adsorption is most effective in pores that have space for one to three layers of gas molecules, for instance with the size of gas molecules being typically between 3 and 5 Å (H2 3 Å, N2 3.5 Å, alkanes 4.5 Å), it is desirable that the sorbent has a least 30%, preferably at least 50% of pores in the range from 6 to 30 Å, and especially 6 to 18 Å, or 7 to 21 Å, or 9 to 27 Å, or 10 to 30 Å. Other useful sorbents include, but are not limited to: carbon molecular sieves, molecular sieves, silica gel, metal organic framework, etc. have special affinity to specific gas adsorption.

The sorbent particles of the invention are generally in the size range of 0.1 to 3,000 microns, preferably from 1 to 500 microns, and most preferably from 5 to 100 microns in diameter. In certain embodiments, sorbent particles have a multimodal particle size distribution, for instance with some particles having an average particle size of less than 100 microns, and some particles having an average particle size of more than 200 microns. Sorbent particles can also be in the form of fibers of 0.1 to 250 microns in diameter of essentially unlimited length to width ratio. Fibers are preferably chopped to no more than 5 mm in length.

Sorbent fibers or powders should have sufficient thermal conductivity to allow heating of the powder mixtures. In addition, in an extrusion process, the particles and fibers must have melting points sufficiently above the melting point of the fluoropolymer binder resin to prevent both substances from melting and producing a continuous melted phase rather than the usually desired multi-phase system.

There are many sources of activated carbon and various techniques to differentiate the performance of each activated carbon per application. Sources of activated carbon include, but are not limited to, coconut shell, bitumen, coal, grass, organic polymers, hard wood, and soft wood. Each product has their own characteristics which can affect gas sorption and desorption performance. It is known that for gas sorption onto activated carbon it is dependent on the close proximity to surface area contact coupled with Van der Waal's forces to attract gas molecules and temporarily store them until desorption occurs. Key characteristics of the activated carbon which impacts the volume of gas sorption is the macro-, micro-, meso-porosity of the carbon surface area. The porosity is further characterized by the BET surface area curves. In general, high BET surface area of at least 1,400 $m^2/g$ is preferred, of at least 2,000 $m^2/g$ is especially preferred.

It has been found that a hard carbon with low BET surface area is preferred to economically manufacture densified block with known state of the art manufacturing. However the hard carbons having a low BET surface area are not preferred for gas sorption performance, but a soft carbon with high BET surface area is preferred. A soft carbon cannot be highly densified or manufactured at an economical rate using solid state extrusion or compression molding. Surprisingly, it has been discovered that unique blends of soft carbon and hard carbon can achieve both an economic manufacturing process and also achieve high performance gas sorption characteristics.

For the solid state extrusion process, a minimum of 5 percent by weight, preferably 10 weight percent, and preferably in the range of 10-60 weight percent of hard carbon is used to resist the pressure of the extruder and extrude a block structure. A higher level of the hard carbon, up to 100 weight percent will produce a well-formed solid state extruded block, however, the higher cost, and lower BET surface area of the hard carbon reduce performance and economics. Blocks prepared containing entirely soft carbons are possible, but the extrusion speed may be limited due to their compressibility. Blocks containing entirely soft carbons can be more efficiently produced by a compression molding process.

Hard carbons are considered those with a ball pan hardness per ASTM D 3802 to be greater than 80% and soft carbons are considered when measured by the same method as being less than or equal to 80%. Low BET surface area is considered less than 1400 $m^2/g$. while high 2 BET surface area is considered greater than or equal to 1400 $m^2/g$. The pore sizes of porous materials are categorized by International Union of Pure and Applied Chemistry (IUPAC) as follows. Pores with size of less than 2 nm in diameters are micropores, pores with size of between 2 nm and 50 nm are mesopores, and pores with size of more than 50 nm are macropores.

Process

The binder and sorbent particles may be blended and processed by several methods. The binder particles are generally in a powder form, which can be dry blended with the sorbent materials. Solvent or aqueous blends may also be formed by known means. Preferably 0.3 to 30, preferably 0.5 to 25, and more preferably 1 to 16 weight percent of binder is used for each 84 to 99.5 weight percent of sorbent material. Preferably the level of binder is from 4 to 12 weight percent, and even more preferably from about 5 to 10 weight percent.

There are generally three methods to form a solid porous sorbent article from a homogeneous mixture of the sorbent and binder: 1) dry powder homogeneous blends which are compression molded, 2) dry powder homogeneous blends which are extruded, and 3) solvent or aqueous blends which are cast and dried. Because a very dense solid sorbent article is desired, compression molding and extrusion processing at higher pressures can be used. The compression molding and extrusion processes are practiced in a manner that causes a softening of the polymer binder particles, but does not cause them to melt and flow to the point that they contact other polymer particles and form agglomerates or a continuous layer. To be effective in the contemplated end-uses, the polymer binder remains as discreet polymer particles that bind the sorbent materials into an interconnected web, for good permeability. In a solvent system, individual polymer particles no longer exist, as they are dissolved and form a continuous coating over the sorbent particles. The continuous coating reduces the amount of activated surface area available for adsorption on the particles, and can reduce their overall effectiveness.

The most economical solution for high quality and high output capacity is utilizing the extrusion process which makes uniform and highly packed immobilized porous media.

An advantage of the extrusion is that the sorbent density is fairly constant across the article, while a compression molded article tends to show a density gradient. It is increasingly difficult to have a uniform packing density gradient on a compression molded article especially as the aspect ratio (length/diameter ratio) increases. An advantage of a compression molded process is that a large variety of shapes are available.

The polymer binder particles can be formed into a porous block article in an extrusion process, such as that described in U.S. Pat. No. 5,331,037. The polymer binder/sorbent material composite of the invention is wet or dry-blended, optionally with other additives, such as processing aids, and extruded, molded or formed into articles. Continuous extrusion under heat, pressure and shear can produce an infinite length 3-dimensional multi-phase profile structure. In order to form the continuous web of forced-point bonding of binder to the sorbent materials, a critical combination of applied pressure, temperature and shear is used.

The extrusion process can produce a continuous block structure at any diameter and length desired. Lengths of 1 cm to hundreds of meters are possible with the right manufacturing equipment. The continuous solid block can then be cut into desired final lengths. Typical diameters of the solid blocks would be 15 cm or less, and more preferably 15 cm or less—though with the proper size die(s) larger diameter structures up to 1.5 meters and larger could be produced.

An alternative to a single, solid structure, is forming two or more structures—a solid rod, and one or more hollow block cylinders designed to nest together to form the larger structure.

Once each annular or rod-shaped block component is formed, the components can be nested together to create a larger structure. This process can provide several advantages over the extrusion of a single large structure. The blocks with smaller cross-sectional diameter can be produced at a faster rate than producing a large, solid, single-pass block. The cooling profile can be better controlled for each of the smaller-cross sectional pieces. A further advantage of this concept may be reduced gas diffusion path lengths through the monoliths as the spacing between concentric blocks could serve as channels for rapid flow of gas.

Properties

Articles formed by the invention are high density, porous, solid articles that maximize the volume of sorbent to volume of the container ratio.

The articles formed are used within a closed container capable of holding a pressurized gas of up to 5000 psi. The sorbent composite article should fit with a narrow tolerance inside the container, to maximize the amount of sorbent per container volume. The container will have an inlet which will be used to fill the container with gas and will have a discharge end where the gas can leave the container. The sorbent material does not settle or move during use, such as to power a vehicle, as it is interconnected by the binder particles. Gas is provided into the container under pressure, and is adsorbed and stored by the sorbent material. When the pressure is released, and the container open to a lower pressure environment, the gas will desorb from the sorbent material, and be used in the application.

The gas storage article has an immobilized density greater than 1.1 times, preferable greater than 1.3 times, and most preferably greater than 1.5 times that of the apparent density of the sorption media. Densification permits more storage capacity per unit volume, thus increasing the possible $v/v_o$ in a given gas storage article.

The gas storage article has a percent fouling of the sorbent of less than 15%, preferably less than 10%, more preferably less than 5%.

The gas storage article is combined with one or more gases selected from, but not limited to, noble gases, hydrocarbons, hydrogen-based gases, methane, natural gas, CO2, CO, O2, N2, fluorinated gases, halogenated gases, silanes, phosphine, phosgene, boron trihalides, ammonia, hydrogen halide, sulfide, and cyanide. In one embodiment, the gas is natural gas. In another embodiment, the gas is not hydrogen H2.

In one embodiment, the container holding the composite solid sorbent article, is used to power a vehicle. Other embodiments, the container holding the composite is for storage purposes to supply fuel to grill and stove burners, refrigerators, freezers, furnaces, generators, emergency equipment, etc.

EXAMPLES

Test Methods:

Particle size of activated carbon is measured using a TYLER RX-29 sieve shaker. The data is reported either as a weight average particle size, or as a nominal "m×n" size where at least 90 wt % particles are larger than "n" mesh and at least 90 wt % particles are smaller than "m" mesh.

Particle size of polymeric powder is measured using a Malvern Masturizer 2000 particle size analyzer. The data is reported as weight-average particle size (diameter)

Powder/latex average discrete particle size is measured using a NICOMP™ 380 submicron particle sizer. The data is reported as weight-average particle size (diameter).

BET specific surface area, pore volume, and pore size distribution of materials are determined using a QUANTACHROME NOVA-E gas sorption instrument. Nitrogen adsorption and desorption isotherms are generated at 77K. The multi-point Brunauer-Emmett-Teller (BET) nitrogen adsorption method is used to characterize the specific surface area. A Nonlocal Density Functional Theory (NLDFT, N2, 77 k, slit pore model) is used to characterize the pore volume and pore size distribution.

Bulk density measurement of materials or blocks are made by measuring the weight of material or block contained in a known volume, after the material or block has been dried at 110 C under vacuum for 8 hours The Percent fouling of the sorbent is calculated as [1−(BET specific surface area of block*100)/(BET specific area of sorbent*wt. % sorbent in block)]*100.

Example 1

Dry powder blends are formed by dry blending 15 wt % of Kyblock® FG-81 polyvinylidene fluoride homopolymer binder from Arkema and 85 wt % of Oxbow 8325CAW/70 coconut shell activated carbon. The Kyblock® FG-81 has a weight average particle size of 9 microns, and a discrete weight average particle size of 220 nm. The activated carbon is a nominally 80×325 mesh carbon, but also includes particles smaller than 325 mesh (44 micrometers) and greater than 80 (177 micrometers) mesh with a particle size distribution designed to maximize the particle packing density. The two dry, powdery materials are mixed in a high shear mixer or a planetary centrifugal mixer, until they are a homogeneous blend. The blend is then forced into a die which is heated to a minimum of 180° C. under pressures greater than 100 psi, forming a self-supporting, porous structure with good mechanical integrity. The structure is then cooled to room temperature. The bulk density of the activated carbon is initially 0.49 g/cc and this density is increased to 0.71 g/cc when combined with the binder and extruded. Under higher packing pressure loadings the density can be increased even further. The pure carbon powder has a specific surface area BET (m^2/g) of 1150. The 15 wt % Kyblock® FG-81 block has a specific surface area BET (m^2/g) 973. After normalizing by weight percent of sorbent, the Kyblock® FG-81 is responsible for 0.4% fouling of the activated carbon surface, which is less than 10% fouling, and even less than 5% fouling.

Example 2 (Comparative)

The same activated carbon used in Example 1 is combined with 15 wt % of MICROTHENE FN510-00 (LyondellBassell) linear low density polyethylene (PE) binder. A block of the same bulk density is prepared by a comparable solid state extrusion process. The Microthene FN510-00 powder has a weight average particle size of 22 microns, and the particles are not made of discrete smaller particles. The pure carbon powder has a specific surface area BET (m^2/g) of 1150. The 15 wt % FN510-00 block has a specific surface area BET (m^2/g) 674. After normalizing by weight percent of sorbent, the FN510-00 is responsible for 30% fouling of the activated carbon surface. The Kyblock®-based block prepared in Example 1 is greater than 80× more fouling resistant then the PE sample of Example 2. Due to its high particle size, the polyethylene binder leads to a high level of fouling of the sorbent.

Example 3

A dry powder blend of 14 wt. % KYBLOCK® FG-42 polyvinylidene fluoride copolymer and 86 wt. % of the same activated carbon in EXAMPLE 1 is prepared in a low shear mixer. The Kyblock® FG-42 has a weight average particle size of 12 microns, and a discrete weight average particle size of 220 nm. The powder blend is filled into a 10" tall steel annular mold with an outside diameter of 2.5" and an inside diameter of 1.25". The mold containing powder is heated to 400° F. for one hour, and compressed with a hydraulic ram to achieve a block bulk density of 0.7 g/cc. The pure carbon powder has a specific surface area BET (m^2/g) of 1150. The 14 wt % Kyblock® FG-42 block has a specific surface area BET (m^2/g) 953 m2/g.

Example 4 (Comparative)

A dry powder blend of 30 wt % Microthene FN510-00 used in Example 2, and 70 wt % of the same activated carbon in EXAMPLE 1 is prepared in a low shear mixer and compression molded into an annular monolith of the same dimensions and density as in EXAMPLE 3. Due to its high particle size, a higher level of Microthene FN510-00 binder is required to produce a block with adequate strength by compression molding. The pure carbon powder has a specific surface area BET (m^2/g) of 1150. The 30 wt % FN510-00 block has a specific surface area BET (m^2/g) 600 m2/g. For blocks of examples 3 and 4 produced by compression molding, the binder weight percent loading is much higher for FN510-00 than for Kyblock® FG-42, to achieve similar mechanical strength. This leads to further reduction of BET specific area of the activated carbon when using FN510-00 as the binder.

Example 5

An extruded annular monolith is produced by first preparing a dry powder blend containing 20 wt. % FX1184 (Jacobi Carbons) wood based carbon with BET specific surface area of 1400 m$^2$/g ground and sieved to 120×625 mesh, 70 wt. % of 80×325 mesh carbon described in EXAMPLE 1, and 10 wt. % Kyblock® FG-81 binder, in a low shear mixer. A 1.9" outside diameter by 1.19" inside diameter annulus is extruded using a processing temperature of 230° C. at a rate of 2 cm/min. The bulk density of the resulting block is 0.62 g/cc. The BET specific surface area of the extruded block is 1176 m$^2$/g.

Example 6

A dry powder blend is formed by dry blending 10 wt % of Kyblock® FG-81 polyvinylidene fluoride homopolymer binder from Arkema and 90 wt % of Ingevity Nuchar SA-1500 activated carbon. The activated carbon has a bulk density of less than 0.4 g/cc, a weight average particle size of about 50 micron, a BET specific surface area of 2,010 m$^2$/g, a total pore volume of 1.28 cc/g, a volume of 6-18 Å pores of 0.50 cc/g, a volume of 7-21 Å pores of 0.56 cc/g, and a volume of 9-27 Å pores of 0.68 cc/g. The Kyblock® FG-81 powder has a specific gravity of 1.78 g/cc, a weight average particle size of 9 microns, and a discrete weight average particle size of 220 nm. The two dry, powdery materials are mixed in a low shear mixer or a planetary centrifugal mixer until they are a homogeneous blend. SEM analysis shows good dispersion of discrete binder particles on the surface of carbon particles. The blend is heated in an oven at 240° C., then compression molded under 15,000 psi pressure to produce a block. The resulting block has good mechanical integrity, a bulk density of 0.50 g/cc, a BET specific surface area of 1,750 m$^2$/g, a total pore volume of 1.06 cc/g, a volume of 6-18 Å pores of 0.48 cc/g, a volume of 7-21 Å pores of 0.56 cc/g, and a volume of 9-27 Å pores of 0.61 cc/g. Under higher packing pressure loadings, the bulk density can be increased even further.

Example 7

The same materials and process as in example 6 are used, except that the weight percent binder is 25 wt %. The resulting block has excellent mechanical integrity, and a bulk density of 0.58, a BET specific surface area of 1,380 m$^2$/g, a total pore volume of 0.80 cc/g, a volume of 6-18 Å pores of 0.40 cc/g, a volume of 7-21 Å pores of 0.45 cc/g, and a volume of 9-27 Å pores of 0.58 cc/g.

Example 8

The same materials and process as in example 6 are used, except that the weight percent binder is 5 wt %. The resulting block has average mechanical integrity, and a bulk density of 0.51.

Example 9

The same materials and process as in example 6 are used, except that the discrete particle size of the binder is 150 nm, and the binder loading is 5 wt %. The resulting block has improved mechanical integrity over the block of example 6.

Example 10

The same materials and process as in example 6 are used, except that the discrete particle size of the binder is 90 nm, and the binder loading is 5 wt %. The resulting block has poor to average mechanical integrity.

Example 11

The same materials and process as in example 6 are used, except that the Kyblock® FG-81 binder is used in a latex form and mixed with the activated carbon in a low shear mixer. The blend contains about 40-60 wt % water, and is subsequently dried in an oven at 110° C. for 8 hours, prior to heating and compression molding steps. The resulting block has good mechanical integrity.

Example 12

A powder blend is formed by blending Dyneon TF5060GZ polytetrafluoroethylene 60 wt % aqueous solution and the same activated carbon used in example 1, in a high shear mixer. The TF5060GZ has a specific gravity of 2.16, a discrete weight average particle size of 220 nm. The blend contains 40-60 wt % water and a weight percent ratio of solid PTFE to activated carbon of 10 to 90, and is subsequently dried in an oven at 110° C. for 8 hours. The blend is heated in an oven at 220° C., then compression molded under 15,000 psi pressure to produce a block. The resulting block has good mechanical integrity, and a bulk 0.43 g/cc. Under higher packing pressure loadings, the bulk density can be increased even further.

Example 13

The same materials and process as in example 10 are used, except that the weight percent of solid PTFE binder is reduced from 10 wt % to 5 wt %. The resulting block has good mechanical integrity, and a bulk density of 0.41 g/cc.

Example 14

A powder blend is formed by blending Dyneon TF5060GZ polytetrafluoroethylene 60 wt % aqueous solution, Arkema Kyblock® FG-81 polyvinylidene fluoride homopolymer, and the same activated carbon used in example 1, in a low shear mixer. The blend contains 40-60 wt % water and a weight percent ratio of solid PTFE to solid PVDF to activated carbon of 5 to 5 to 90, and is subsequently dried in an oven at 110° C. for 8 hours. The blend is heated in an oven at 240° C., then compression molded under 15,000 psi pressure to produce a block with good mechanical integrity.

Example 15

The same materials and process as in example 6 are used, except that the activated carbon has a bimodal particle size to improve packing density, and the binder is used at 25 wt % loading. The activated carbon consists of 33 wt % of Ingevity Nuchar SA-1500 with weight average particle size of 50 micron, and 67 wt % of Ingevity Nuchar WVA-1500 which has been ground and sieved to 50×625 mesh. WVA-1500 has similar BET surface area, pore volume and pore size distribution as SA-1500, as described in example 6. The resulting block has good mechanical integrity, and a bulk density of 0.66 g/cc.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The invention claimed is:

1. A gas storage article comprising a solid, dense, porous sorbent media bound together by thermoplastic binder particles, wherein said binder particles have an average discrete particle size of between 5 nm and 700 nm, wherein the thermoplastic binder particles comprise from 0.3 to 30 weight percent of the gas storage article, wherein the sorbent media is capable of adsorbing and desorbing a gas and wherein the density of the gas storage article is greater than 0.49 g/cc up to 0.71 g/cc, wherein at least 30% of the pores in the sorbent media are from 6 to 18 A (0.6 nm to 1.8 nm) in size, and wherein said sorbent has a multimodal particle size distribution.

2. The gas storage article of claim 1, wherein said thermoplastic binder is selected from the group consisting of fluoropolymers, styrene-butadiene rubbers (SBR), ethylene vinyl acetate (EVA), acrylic polymers, polymethyl methacrylate polymers and copolymers, polyurethanes, styrenic polymers, polyamides, polyolefins, polyethylene and copolymers thereof, polypropylene and copolymers thereof, polyethylene oxide, polyesters, polyethylene terephthalate, polyvinyl chlorides, polycarbonate, polyether ketone ketone (PEKK), polyether ether ketone (PEEK), and thermoplastic polyurethane (TPU).

3. The gas storage article of claim 2, wherein said thermoplastic binder is selected from one or more of the group consisting of polyvinylidene fluoride homopolymer and copolymer, polytetrafluoroethylene homopolymers and copolymers, and polyamides.

4. The gas storage article of claim 2, wherein said thermoplastic binder comprises a fluoropolymer, said fluoropolymer comprising one or more monomers selected from the group consisting of vinylidene fluoride (VDF), tetrafluoroethylene (TFE), trifluoroethylene (TrFE), chlorotrifluoroethylene (CTFE), hexafluoropropene (HFP), vinyl fluoride (VF), hexafluoroisobutylene (HFIB), perfluorobutylethylene (PFBE), pentafluoropropene, 3,3,3-trifluoro-1-propene, 2-trifluoromethyl-3,3,3-trifluoropropene, fluorinated vinyl ethers including perfluoromethyl ether (PMVE), perfluoroethylvinyl ether (PEVE), perfluoropropylvinyl ether (PPVE), perfluorobutylvinyl ether (PBVE), longer chain perfluorinated vinyl ethers, fluorinated dioxoles, partially- or per-fluorinated alpha olefins of $C_4$ and higher, partially- or per-fluorinated cyclic alkenes of $C_3$ and higher, and combinations thereof.

5. The gas storage article of claim 1, wherein the gas is methane.

6. The gas storage article of claim 1, wherein said sorbent is selected from the group consisting of activated carbon, carbon fibers, molecular sieves, carbon molecular sieves, molecular sieves, silica gel, and metal organic framework.

7. The gas storage article of claim 6, wherein said sorbent is activated carbon or carbon fibers.

8. The gas storage article of claim 6, wherein said sorbent has a BET specific surface area greater than 1,000 $m^2/g$.

9. The gas storage article of claim 6, wherein said sorbent has a BET specific surface area greater than 1,400 $m^2/g$.

10. The gas storage article of claim 6, wherein said sorbent has a pore volume of at least 0.7 cc/g, and/or more than 30% of pore volume with pore sizes in the range of 6 to 30 Å.

11. The gas storage article of claim 6, wherein said sorbent has a porosity higher than 40%.

12. The gas storage article of claim 1, wherein said article comprises two or more concentric nesting annuli produced by either solid state extrusion or compression molding.

13. The gas storage article of claim 1, wherein said gas storage article is present within a container capable of holding a pressurized gas at pressures up to 5000 psi.

14. The gas storage article of claim 1 wherein said gas storage device further comprises at least one adsorbed gas selected from the group consisting of noble gases, hydrocarbons, hydrogen-based gases, methane, natural gas, CO2, CO, O2, N2, fluorinated gases, halogenated gases, silanes, phosphine, phosgene, boron trihalides, ammonia, hydrogen halide, sulfide, and cyanide.

15. The gas storage article of claim 1 wherein the density of the gas storage article is greater than 1.1 times that of the bulk density of the sorbent.

16. The gas storage article of claim 1 having a percent fouling of the sorbent of less than 15%.

17. A method for producing a gas storage article, the method comprising the steps of:
   a) blending a sorbent and thermoplastic binder, wherein said blend comprises 0.3 to 30 weight percent binder,
   b) optionally heating blend
   c) processing by extrusion or compression molding,
to form a gas storage article, wherein the density of the gas storage article is greater than 1.3 times that of the bulk density of the sorbent.

18. The method of claim 17, wherein said blending step comprises an aqueous or solvent blend of said sorbent and said thermoplastic binder.

19. The method of claim 17, wherein said heating, compression, and/or extrusion step occurs at a temperature at or below the melting point of said binder.

20. A gas storage article comprising a sorbent media bound together by thermoplastic binder particles, wherein said binder particles have an average discrete particle size of between 5 nm and 700 nm, wherein the thermoplastic binder particles comprise from 0.3 to 30 weight percent of the gas storage article, wherein the sorbent media is capable of adsorbing and desorbing a gas, wherein the density of the gas storage article is greater than 1.1 times that of the bulk density of the sorbent and wherein the sorbent media has a ball pan hardness of less than 80% and wherein at least 30% of the pores in the sorbent media are from 6 to 18 A (0.6 nm to 1.8 nm) in size.

21. The gas storage article of claim 20 wherein the density of the gas storage article is greater than 1.3 times that of the bulk density of the sorbent.

22. The gas storage article of claim 20, wherein the gas is methane.

* * * * *